United States Patent Office 3,392,922
Patented July 16, 1968

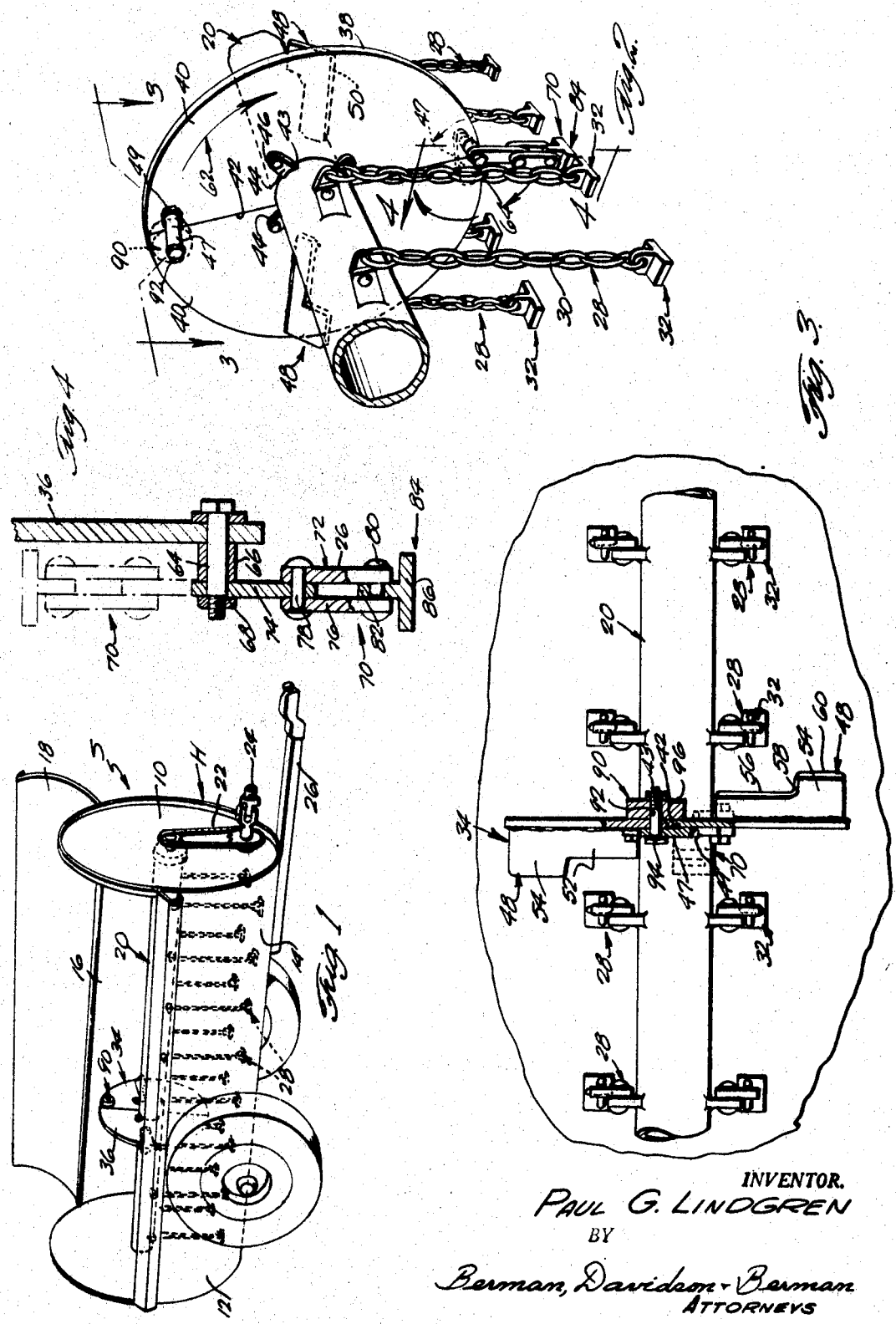

3,392,922
FLAIL-TYPE MATERIAL SPREADER
WITH LOAD OPENER
Paul G. Lindgren, Albert City, Iowa 50510
Filed Dec. 28, 1965, Ser. No. 516,853
4 Claims. (Cl. 239—658)

ABSTRACT OF THE DISCLOSURE

A machine comprising a hollow generally cylindrical hopper having a top opening extending therealong, a flail shaft extending axially along the hopper and journalled at its ends thereon, a plurality of flexible chain flails secured to the flail shaft at locations spaced therearound and at locations spaced therealong, a material breaking and displacing device fixed to the flail shaft between adjacent flails thereof.

---

This invention relates to flail-type spreaders, and more particularly to a load opener for incorporation in or application thereto as an accessory.

In the operation of flail-type spreaders or unloaders, when the material being handled is relatively compacted or solid, as when frozen, or the material while otherwise relatively fluid, contains solid or compacted chunks of material, difficulties in uniformly unloading or spreading the material are experienced, which difficulties include damage to the machines, total or partial failure to properly unload the material, until the material has been thawed out and/or has been broken up and mixed by hand, at considerable loss of time and labor.

The primary object of the present invention is the provision of a load opener device, either in the form of an original component of spreaders or unloaders, or as an accessory applicable thereto, when the need for the same arises, which takes the form of at least one disc fixed on the rotary shaft which carries and operates the existing flails, the disc having, on its opposite sides, vane means which are arranged and constructed to split up and displace compacted material present in the hopper of the machine, as the flail shaft is rotated, whereby the material is broken up into a condition in which it can be flailed effectively by the existent flails and unloaded out of the hopper.

Another object of the invention is the provision of a device of the character indicated above, wherein the vane means comprises substantially radial vanes, fixed to the opposite sides of the disc, which are angled, relative to the plane of the disc, so as to effect a cleaving and separating action on the material in the hopper, as the disc is rotated.

A further object of the invention is the provision of a device of the character indicated above, wherein a single flail is operatively secured to one side of the disc, near its perimeter, which aids in the breaking up of material in the hopper, the disc being provided, on its opposite side, at a location diametrically opposite to its single flail, with a lateral counterbalance weight which serves not only to counteract the centrifugal effect of the single flail, but acts as a hammer, aiding in the breaking up of the material.

In the drawings:

FIGURE 1 is a perspective view of a substantially conventional form of flail-type spreader, equipped with a device of the present invention;

FIGURE 2 is an enlarged fragmentary front perspective view of said device;

FIGURE 3 is a horizontal section, taken on the line 3—3 of FIGURE 2; and,

FIGURE 4 is a further enlarged fragmentary vertical section, taken on the line 4—4 of FIGURE 2.

Referring in detail to the drawings, a spreader S is shown, which comprises a horizontal, longitudinally elongated hollow, wheeled hopper H, of cylindrical cross section, having front and rear end walls 10 and 12, respectively. The side wall 14 of the hopper, which extends for substantially two-thirds of the way around the hopper H, from the bottom thereof, defines a longitudinally elongated, horizontal rectangular opening 16, out of which material present in the hopper is adapted to be discharged or unloaded. An arcuate cross section cover 18 is hinged along an edge of the side wall 14 to partially cover the top opening 16. The cover 18 is narrower than the opening 16, so that when closed, a relatively narrow discharge opening 16' is defined, between the cover and a related side of the opening 16, through which the material is adapted to be discharged.

A flail shaft 20, positioned axially in the hopper H, is journalled at its ends, through the hopper end walls 10, 12, and, at its forward end, is operatively connected, as indicated at 22, to a drive shaft 24, leading to the drive of a tractor (not shown) to which the machine is hitched by a draw bar 26. The flail shaft 20 is rotated, in the hopper H, in a direction to discharge material out of the hopper opening 16'.

The flail shaft 20 has secured thereto, at intervals therealong, flails 28, which consist of fully flexible chains 30, having T-shaped hammers 32, on their outer ends, which normally are positioned, close to the side wall 14 of the hopper H, and which, when the shaft 20 is rotated, are adapted to flail material present in the hopper and fling the same out of the hopper.

In accordance with the present invention, at least one material breaking and disintegrating device 34, is fixed around the flail shaft 20, in the space between adjacent existing flails 28, preferably near the longitudinal center of the hopper H.

The device 34 comprises a single flat circular disc 36, substantially smaller in diameter than the hopper H, and having a peripheral edge 38 which is concentrically spaced from the hopper side wall 14.

For ease of installation on the flail shaft 20, the disc 36 is preferably composed of two similar semi-circular sections 40, formed in their straight dimetrical grooved and interfitted inner edges 42, with notches 43, which conformably receive and engage the shaft 20. Circumferentially spaced radial ears 44 are suitably affixed to the shaft 20 and bear against the opposite sides of the disc, and bolts 46 extend through the ears 44 and the disc sections, so that these sections are fixed together and to the shaft 20. The disc sections 40 are secured, relative to each other, by means of straps 47, bridging the sections, and welded, as indicated at 49, to one section and traversed at their other end by a bolt 92, in one case, and in the other by a bolt 64, which extends through the other disc sections.

Oppositely angled vanes 48 are fixed to the front and rear sides of the disc 36, as by means of weldings 50, the vanes 48 being disposed on the same radii of the disc, at locations equally spaced from the edges 42 of the sections 40 on which they are fixed, and extend radially from the shaft 20 to the peripheral edge 38 of the disc. The front vane 48, as shown in FIGURE 2, is angled forwardly and downwardly relative to the disc 36.

As shown in FIGURES 2 and 3, the vanes 48 are in the form of radially elongated flat plates which have relatively narrow parallel sided rectangular inner end portions 52, and relatively wide outer rectangular end portions 54, the outer edges 56 of the portions 52 being flared as indicated at 58, into the radially inward ends of the outer edges 60 of the portions 54. The outer edges 60 of the outer end portions 54 are, like the outer edges of the inner end portions 52, parallel to the disc 36.

The vanes 48 are disposed at similar trailing angles, relative to the disc 36, and its direction of rotation, indicated by an arrow 62, in FIGURE 2. While the vanes 48 can be disposed at different angles, relative to the disc 36, a good working arrangement is obtained by using an acute angulation thereof, as shown.

At a point close to the peripheral edge 38 of the disc 36, and close to the inner edge of the related disc section 40, a bolt 64 traverses this section and extends to opposite sides thereof, and a spacer sleeve 66 is circumposed on the bolt 64, which engages the related side of the disc section, but is spaced from the head 68 of the bolt. A single abbreviated or short flail 70 is journalled on the bolt 64 between its head 68 and the adjacent end of the sleeve 66. The short flail 70 is located in the path of travel of the front vane 48, and is preceded by the front vane as the disc 36 is rotated in the material to be handled.

The single flail 70 comprises a relatively short rigid chain 72 composed of a single flat rigid link 74 which is journalled, at its inner end, on the bolt 64, and a pair of flat rigid links 76, which bear against the opposite sides of the single link 74, and are pivotally secured thereto, at its outer end, as by means of an inner headed pin 78. At their outer ends, the links 76 are similarly pivotally secured, as indicated at 80, to a centered lug 82 of a T-shaped hammer 84, the links 76 being engaged with the opposite sides of the lug 82. The hammer 84 comprises a rectangular transverse cross head 86, on the outer end of the lug 82. As indicated in FIGURE 2, the outer extremity of the hammer 84, when in pendant position, as shown, or when centrifugally extended, is in line with the outer extremities of the hammers 32 of the existent flails 28. However, the single flail 70, due to its shortened length and the manner of its pivoting to the disc 36, can swing, relative to the existent flails 28, and relative to the disc 36, in shorter arcs, as the disc 36 is rotated, and can rotate completely around its pivotal point, independently of the position of rotation of the flail shaft 20 and the existent flails 28. Because of this arrangement, and the fact that the single flail chain 72 is not free to flex and swing laterally, relative to the disc, as are the flexible chains of the existent flails, the sphere of action of the single flail 70 is designedly confined to the area adjacent to the disc 36, for predetermined and positively maintained breaking up action upon material present in the hopper H, in the region of the device 34, and the disc's vanes 48. The coactions of the vanes 48 and the single flail 70 serve to effectively split and break up the material through positive action thereon, which the material cannot resist to the extent that it can resist the action of the existent flails 28. As a result, the material acted upon by the device 34 is broken up and is progressively made available to the normal action of the resistant flails 28, for uniform discharge out of the hopper H, onto the ground.

The unbalancing weight and centrifugal action represented by the presence of the single flail 70, and its action, as the disc 36 is rotated, is counterbalanced, by means of a counterweight 90, which is positioned on the other of the disc sections 40, like the single flail 70, and is diametrically opposed thereto.

The counterweight 90 comprises one of the bolts 92, extended through the disc 36 and having a head 94, engaged with the strap 47 on the single flail side of the disc and extending beyond the other side of the disc, and through a disc 96 which is held against the related side of the disc 36.

What is claimed is:

1. A machine comprising a hollow generally cylindrical hopper having a top opening extending therealong, a flail shaft extending axially along the hopper and journalled at its ends thereon, a plurality of flexible chain flails secured to the flail shaft at locations spaced therearound and at locations spaced therealong, a material breaking and displacing device fixed to the flail shaft between adjacent flails thereof, said device comprising a disc axially circumposed on and fixed to the flail shaft, and vane means fixed on the opposite sides of the disc, said vane means comprising radial vanes, said vanes being angled relative to the plane of the disc in a direction away from the direction of rotation of the flail shaft, and a single flail secured to one side of the disc adjacent to the peripheral edge of the disc, said single flail comprising a rigid chain pivoted at its inner end to the disc, and a hammer pivoted on the outer end of the rigid chain, and a counterbalance fixed to the disc at a point diametrically opposed to said single flail.

2. A machine according to claim 1, wherein said flail shaft flails comprise fully flexible chains secured at their inner ends to the flail shaft, and hammers secured on the outer ends of the flexible chains, the hammers of the flail shaft flails and the hammer of the single flail being initially at substantially the same distance from the flail shaft, the rigid chain of the single flail being substantially shorter than said flexible chains so as to dispose the hammer of the single flail, at times, at the same distance from the flail shaft as the hammers of the flail shaft flails.

3. A machine according to claim 1, wherein said vanes are flat and have relatively narrow inner end portions and relatively wide outer end portions, full length flexible flails secured to the flail shaft at their inner ends and having hammers at their outer ends, said full flails being spaced from a side of the disc, a short flexible flail secured at its inner end to the said side of the disc at a location adjacent to the peripheral edge of the disc, said short flail having a hammer on its outer end, the hammers of the full length and short flails being initially in similar pendant locations, said short flail being located between the full length flails and the disc.

4. A machine according to claim 1, wherein said vanes are flat and have relatively narrow inner end portions and relatively wide outer end portions, full length flexible flails secured to the flail shaft at their inner ends and having hammers at their outer ends, said full flails being spaced from a side of the disc, a short flexible flail secured at its inner end to the said side of the disc at a location adjacent to the peripheral edge of the disc, said short flail having a hammer on its outer end, the hammers of the full length and short flails being initially in similar pendant locations, said short flail being located between the full length flails and the disc, said vanes comprising a vane located on the said side of the disc, said vane being angled away from the direction of rotation of the disc, with the short flail in trailing relation to the vane and positioned in the sphere of action of the said vane.

References Cited

UNITED STATES PATENTS

| | | | |
|---|---|---|---|
| 1,573,493 | 2/1926 | Heyd | 222—240 |
| 2,510,231 | 6/1950 | Juzwiak | 222—240 |
| 2,715,482 | 8/1955 | Juzwiak | 222—239 X |
| 2,738,195 | 3/1956 | Underwood | 239—658 |
| 2,821,476 | 1/1958 | Green | 222—240 X |
| 3,048,409 | 8/1962 | Elwick | 239—658 |
| 3,173,693 | 3/1965 | Skromme | 239—658 |
| 3,251,579 | 5/1966 | Lasar | 259—46 |

M. HENSON WOOD, JR., *Primary Examiner.*

VAN C. WILKS, *Assistant Examiner.*